United States Patent
Ohara et al.

(10) Patent No.: US 7,869,102 B2
(45) Date of Patent: Jan. 11, 2011

(54) IMAGE READER

(75) Inventors: Toshimitsu Ohara, Matsumoto (JP); Kensuke Tamai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 329 days.

(21) Appl. No.: 12/044,591

(22) Filed: Mar. 7, 2008

(65) Prior Publication Data
US 2008/0225357 A1 Sep. 18, 2008

(30) Foreign Application Priority Data
Mar. 13, 2007 (JP) .............................. 2007-064056

(51) Int. Cl.
*H04N 1/04* (2006.01)
(52) U.S. Cl. .................. 358/486; 358/488; 358/497; 358/474; 358/461; 358/483
(58) Field of Classification Search .............. 358/474, 358/486, 488, 497, 505, 461, 483; 399/211, 399/212, 379, 380; 250/234–236, 239, 216
See application file for complete search history.

(56) References Cited

U.S. PATENT DOCUMENTS

| | | | |
|---|---|---|---|
| 5,828,986 A * | 10/1998 | Horigome et al. ............ 702/126 |
| 7,170,657 B2 | 1/2007 | Higuchi | |
| 7,378,644 B2 * | 5/2008 | Kubota et al. ................ 250/234 |
| 7,672,027 B2 * | 3/2010 | Nakayama et al. ........... 358/498 |
| 2009/0010543 A1 * | 1/2009 | Tamai et al. ................. 382/190 |

FOREIGN PATENT DOCUMENTS

| | | | |
|---|---|---|---|
| JP | 2000-113162 | | 4/2000 |
| JP | 2000-201255 | | 7/2000 |
| JP | 2002-354206 | | 12/2002 |
| JP | 2002-354207 | | 12/2002 |
| JP | 2002354206 A | * | 12/2002 |
| JP | 2003-051918 | | 2/2003 |
| JP | 2003-087515 | | 3/2003 |

* cited by examiner

*Primary Examiner*—Cheukfan Lee
(74) *Attorney, Agent, or Firm*—Workman Nydegger

(57) ABSTRACT

Provided is an image reader including: a transparent original mounting plate on which an original is mounted; a support which has an appearance larger than that of the original mounting plate and supports the original mounting plate; a reading unit which optically reads the original placed on the original mounting plate; a movement unit which moves the reading unit in a predetermined direction within a readable area; and a reference location specifying plate having a positioning hole and a reference mark hole, wherein the support has a positioning protrusion within the readable area, the reference location specifying plate is positioned and fixed with respect to the support by inserting the positioning protrusion into the positioning hole, and the reading unit optically detects the location of the reference mark hole and specifies a reference location of an original reading area from the detected location of the reference mark hole.

4 Claims, 7 Drawing Sheets

IMAGE READER

BACKGROUND

1. Technical Field

The present invention relates to an image reader and more particularly an image reader including a reading unit for optically reading an original mounted on an original mounting plate in an original reading area.

2. Related Art

There is an image reader for reading an image from a transmission original and carrying out electronic information processing of image information. As this image reader, for example, there is known an image reader which includes an original mounting plate which is formed of flat glass for mounting an original and a reading unit for optically reading the original mounted on the original mounting plate from the original mounting plate side, reads an image from the mounted original and carries out electronic information processing of image information.

For example, in an image reader disclosed in JP-A-2000-113162, the reading unit which is a contact image sensor reads white and black specific patterns provided at the outside of an original reading area for reading the original so as to detect a read start location when the reading unit reads the original and the location of a home position waiting before the reading unit starts to read the original.

The specific patterns of the image reader described in JP-A-2000-113162 are formed on a frame surrounding the original mounting plate for mounting the original, for example, by offset printing, but an error in millimeter unit may occur between an actual formation location and an accurate formation location in design. Accordingly, in this case, the same error occurs even in the read start location and the location of the home position detected by reading the specific patterns using the reading unit.

SUMMARY

According to an aspect of the invention, there is provided an image reader including: a transparent original mounting plate on which an original is mounted; a support which has an appearance larger than that of the original mounting plate and supports the original mounting plate; a reading unit which optically reads the original placed on the original mounting plate; a movement unit which moves the reading unit in a predetermined direction within a readable area including the original mounting plate; and a reference location specifying plate having a positioning hole and a reference mark hole, wherein the support has a positioning protrusion within the readable area, the reference location specifying plate is positioned and fixed with respect to the support by inserting the positioning protrusion of the support into the positioning hole, and the reading unit optically detects the location of the reference mark hole of the reference location specifying plate and specifies a reference location of an original reading area, in which the reading unit reads the original, from the detected location of the reference mark hole.

Accordingly, since the reference mark hole which is the reference mark for specifying the reference location when the reading unit reads the original of the original reading area can be formed in the reference location specifying plate together with the positioning hole by a press working method or a machining method using a mold, it is possible to accurately decide the location of the reference mark hole relative to the location of the positioning hole in the reference location specifying plate. Accordingly, by inserting the positioning protrusion of the support into the positioning hole of the reference location specifying plate to fix the reference location specifying plate to the support, the reference location specifying plate is accurately positioned relative to the support. Therefore, compared with the case where the reference mark for specifying the reference location of the original reading area is printed on the support, the positional precision of the reference mark hole, which is the reference mark, relative to the support is improved and thus the reading unit can accurately specify the reference location on the basis of the detected location of the reference mark hole.

The reference mark hole may include a first edge which is parallel to a direction perpendicular to the predetermined direction, and the reading unit may optically detect the location of the first edge of the reference mark hole and specify the reference location of the original reading area in the predetermined direction. Accordingly, since the reading unit can more accurately detect the location of the reference mark hole in the predetermined direction, it is possible to more accurately specify the reference location in the predetermined direction on the basis of the location of the first edge of the reference mark hole.

In the image reader, the reference mark hole may have a rectangular shape and include a first edge parallel to a direction perpendicular to the predetermined direction and a second edge parallel to the predetermined direction, and the reading unit may optically detect the location of the first edge and the location of the second edge of the reference mark hole and specify the reference location of the original reading area. Accordingly, since the reading unit can more accurately detect the location of the reference mark hole in the predetermined direction and the direction perpendicular to the predetermined direction, it is possible to more accurately specify the reference location on the basis of the locations of the first edge and the second edge of the reference mark hole.

In the image reader, the reference location specifying plate may further include a second reference mark hole which has a rectangular shape and includes a first edge parallel to a direction perpendicular to the predetermined direction and a second edge parallel to the predetermined direction, the second edge of the second reference mark hole may cross a straight line which extends from the first edge of the reference mark hole in the direction perpendicular to the predetermined direction, and the reading unit may optically detect the location of the first edge and the location of the second edge of the reference mark hole and specify the reference location of the original reading area. Accordingly, although the corner of the reference mark hole is rounded when the reference mark hole is formed in the reference location specifying plate, the reading unit reads the location of the second edge of the second reference mark hole when reading the location of the first edge of the reference mark hole. Thus, a portion of the rounded corner of the reference mark hole is not read. Accordingly, the reading unit can more accurately specify the reference location of the original reading area on the basis of the location of the first edge of the reference mark hole and the second edge of the second reference mark hole.

In the image reader, the reading unit may include a plurality of light-receiving elements which are arranged in the direction perpendicular to the predetermined direction, and the image reader may further include a correction unit which stores information indicating which of the plurality of light-receiving elements should read the second edge of the reference mark hole and corrects the original reading area in the direction perpendicular to the predetermined direction on the basis of a difference between a light-receiving element, which should read the second edge of the reference mark hole based on the information, and a light-receiving element, which actually reads the second edge of the reference mark hole, among the plurality of light-receiving elements. Accordingly, it can be checked whether the location of the original reading area in the direction perpendicular to the predetermined direction is equal to the location which is decided by the specification of the image reader, and the original reading area can be corrected with respect to this direction if it is checked that the locations are equal to each other.

The image reader may further include a darkly-colored sheet which has a darkly-colored surface and is interposed between the support and the reference location specifying plate, and the darkly-colored surface may be exposed through at least the reference mark hole.

The summary of the invention does not enumerate all features of the invention. A sub-combination of the features may be included in the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of invention will be described, but the following embodiments do not restrict the invention related to claims. In addition, all combinations of features described in the embodiments are not necessary for solving problems.

Figure 1:
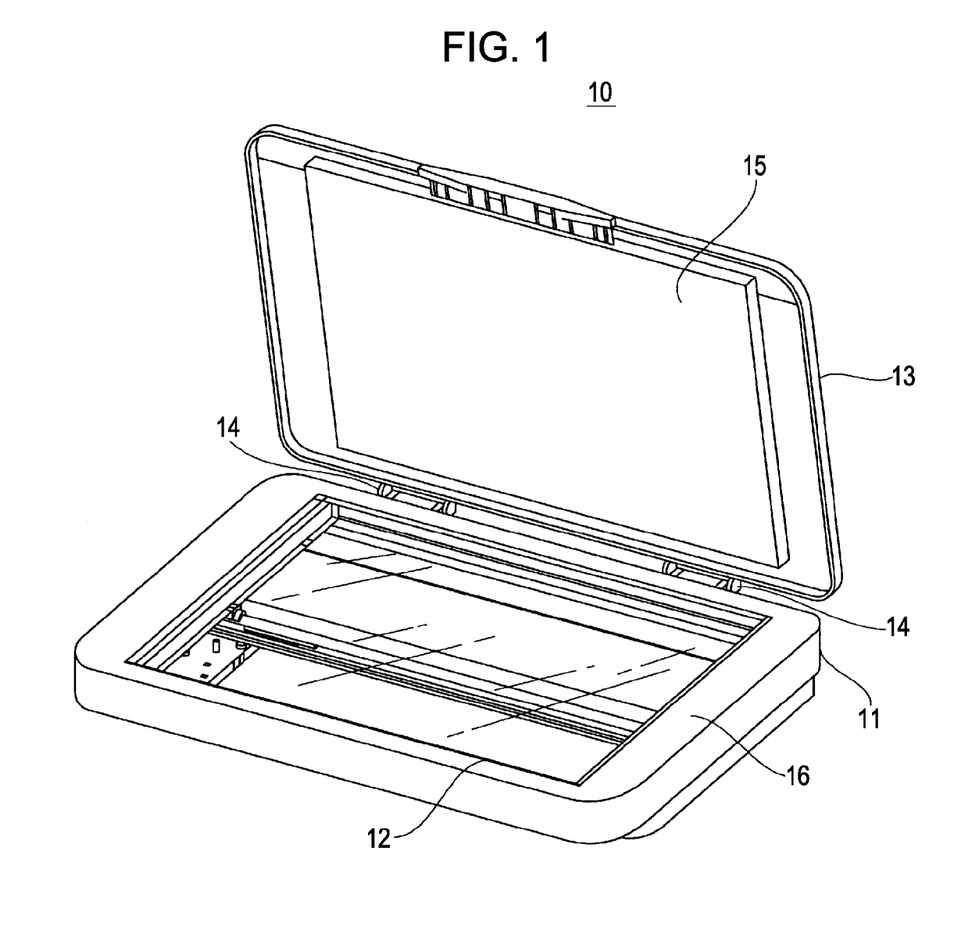
FIG. 1 is a perspective view showing the appearance of an image reader 10 according to an embodiment of the invention.

FIG. 1 is a perspective view showing the appearance of an image reader 10 according to an embodiment of the invention. As shown in FIG. 1, the image reader 10 includes a casing 11 for receiving an internal mechanism, an original mounting plate 12, and an original cover 13 which is rotatably attached to the casing 11 through a hinge 14. At the upper surface of the casing 11, a support 16 for supporting the original mounting plate 12 is formed.

The original mounting plate 12 is an approximately rectangular plate and is attached to the support 16 formed on the upper surface of the casing 11. The original mounting plate 12 is, for example, formed of a transparent glass plate or plastic plate. A sheet material made of white-colored resin is attached to one surface of the original cover 13 so as to form a pressing surface 15. In the image reader 10, an original is placed on the original mounting plate 12 and is pressed by the original cover 13 from top, thereby closely attaching the original to the original mounting plate 12.

Figure 2:
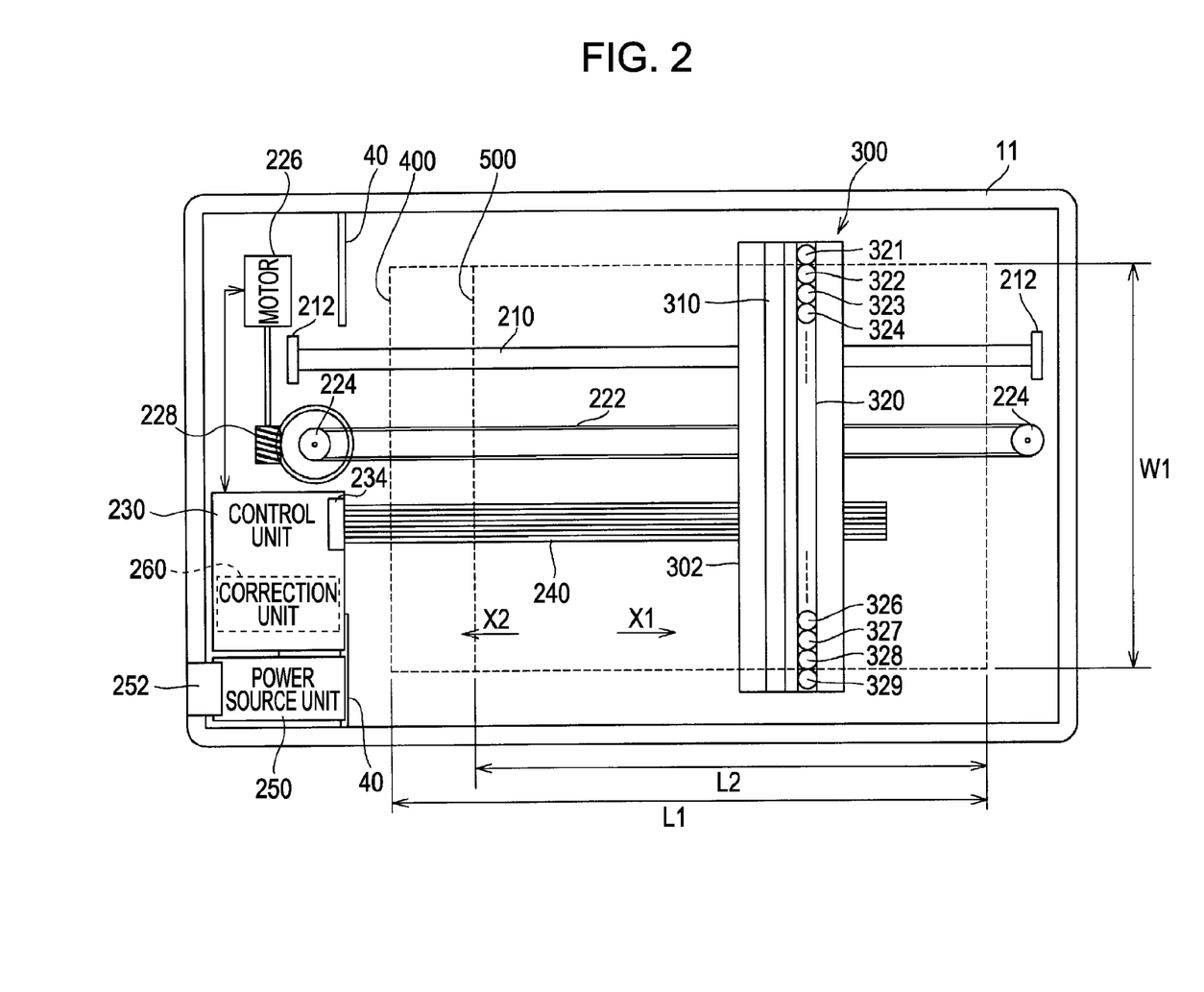
FIG. 2 is a plan view showing an internal mechanism of the image reader 10.

FIG. 2 is a plan view showing the internal mechanism of the image reader 10, which shows a state in which the original cover 13, the original mounting plate 12, the support 16 of the casing 11 and so on are removed from the image reader 10 shown in FIG. 1. As shown in FIG. 2, the image reader 10 further includes a pad 40, a guide rail 210, a timing belt 222, a stepping motor 226, a control unit 230, a flat cable 240, a power source unit 250 and a reading unit 300 at the inside of the casing 11 and the original mounting plate 12. In a composite machine in which the image reader 10 is integrally provided with an ink jet printer, the control unit 230 and the power source unit 250 shown in FIG. 2 may be provided at the side of the ink jet printer.

The guide rail 210 is provide such that the longitudinal direction thereof is parallel to the long side direction of the approximately rectangular original mounting plate 12 and is fixed to the casing 11 by a pair of brackets 212 at the both sides thereof in the longitudinal direction. The reading unit 300 has an approximately rectangular parallelepiped shape and is provided such that the longitudinal direction thereof is parallel to the short side direction of the approximately rectangular original mounting plate 12. The guide rail 210 passes through the reading unit 300.

The timing belt 222 is stretched over a pair of pulleys 224 provided in the vicinity of the guide rail 210 and a portion thereof is coupled to the reading unit 300. One of the pair of pulleys 224 is rotated by the stepping motor 226 through a gear 228 and the timing belt 222 travels between the pair of pulleys 224 when the pulley 224 is rotated. Accordingly, the stepping motor 226 rotates one of the pair of pulleys 224 such that the reading unit 300 is moved along the guide rail 210 in a predetermined direction.

The guide rail 210, the timing belt 222, the pair of pulleys 224, the stepping motor 226 and the gear 228 form one form of a movement unit for moving the reading unit 300 in the predetermined direction. Accordingly, the configuration for moving the reading unit 300 in the predetermined direction is not limited to the above-described form.

The control unit 230 and the power source unit 250 are provided adjacent to the bottom of the casing 11 and are electrically connected to each other. The control unit 230 is electrically connected to the reading unit 300 through a connector 234 and the flat cable 240 and is electrically connected to the stepping motor 226. The control unit 230 detects the number of steps of the stepping motor 226 and controls power supplied from the power source unit 250 to the stepping motor 226 on the basis of the detected number of steps, thereby controlling the movement of the reading unit 300. The control unit 230 has a storage element (not shown) which stores image information, which is image data read by the reading unit 300, and the location information of a read preparation location when the reading unit 300 moves to the read preparation location in a home position detecting operation.

Since the flat cable 240 is flexible, the flat cable 240 does not disturb the movement of the reading unit 300. The control unit 230 is connected to an external device of the image reader 10 through a connector (not shown). Accordingly, the image information read by the reading unit 300 can be transmitted to an external information processor (not shown). The power source unit 250 may accumulate power by itself or may receive power from an external device through a connector 252.

In the following description, the longitudinal direction of the reading unit 300 is referred to as a main scan direction. A moving direction of the reading unit 300, that is, the predetermined direction, is referred to as a sub-scan direction. In the drawings after FIG. 2, directions denoted by arrows X1 and X2 correspond to the sub-scan direction and are respectively referred to as a forward sub-scan direction and a backward sub-scan direction in the following description.

As shown in FIG. 2, a light-emitting unit 310 and a light-receiving unit 320 are arranged on the upper surface of the reading unit 300 in the main scan direction. As the light-emitting unit 310, for example, a light-emitting diode (LED) is used. As shown in FIG. 2, the light-receiving unit 320 includes a plurality of light-receiving elements 321, 322, 323, . . . and 329 arranged in the main scan direction. The plurality of light-receiving elements 321, 322, 323, and 329 receives reflected light of the light irradiated from the light-emitting unit 310 and outputs a voltage having a level according to the intensity of the reflected light received by photoelectric effect.

In the light-receiving elements 321, 322, 323, . . . and 329, for example, a combination of SELFOC lenses for focusing the reflected light of the light irradiated from an image sensor such as a CCD or a CMOS image pickup device and the light-emitting unit 310 is used. The light-receiving unit 320 has an A/D converting circuit for converting an analog value of a voltage output from the light-receiving elements 321, 322, 323, . . . and 329 into a digital value and outputs the analog value to the control unit 230 as a 16-bit digital signal. This digital signal corresponds to the image information stored in the control unit 230.

The light-receiving elements 322, 323, . . . and 328 excluding the light-receiving elements 321 and 329 located at the both ends of the main scan direction among the plurality of light-receiving elements 321, 322, 323, . . . and 329 in the light-receiving unit 320 detect the reflected light of the light irradiated from the light-emitting unit 310 such that the reading unit 300 can optically read an image located at a position facing the light-receiving unit 320 over a length W1 of the main scan direction shown in FIG. 2. The light-receiving elements 321 and 329 located at the both ends of the light-receiving unit 320 are preliminary light-receiving elements used when a correction unit 260 corrects an original reading area 500.

Figure 3:
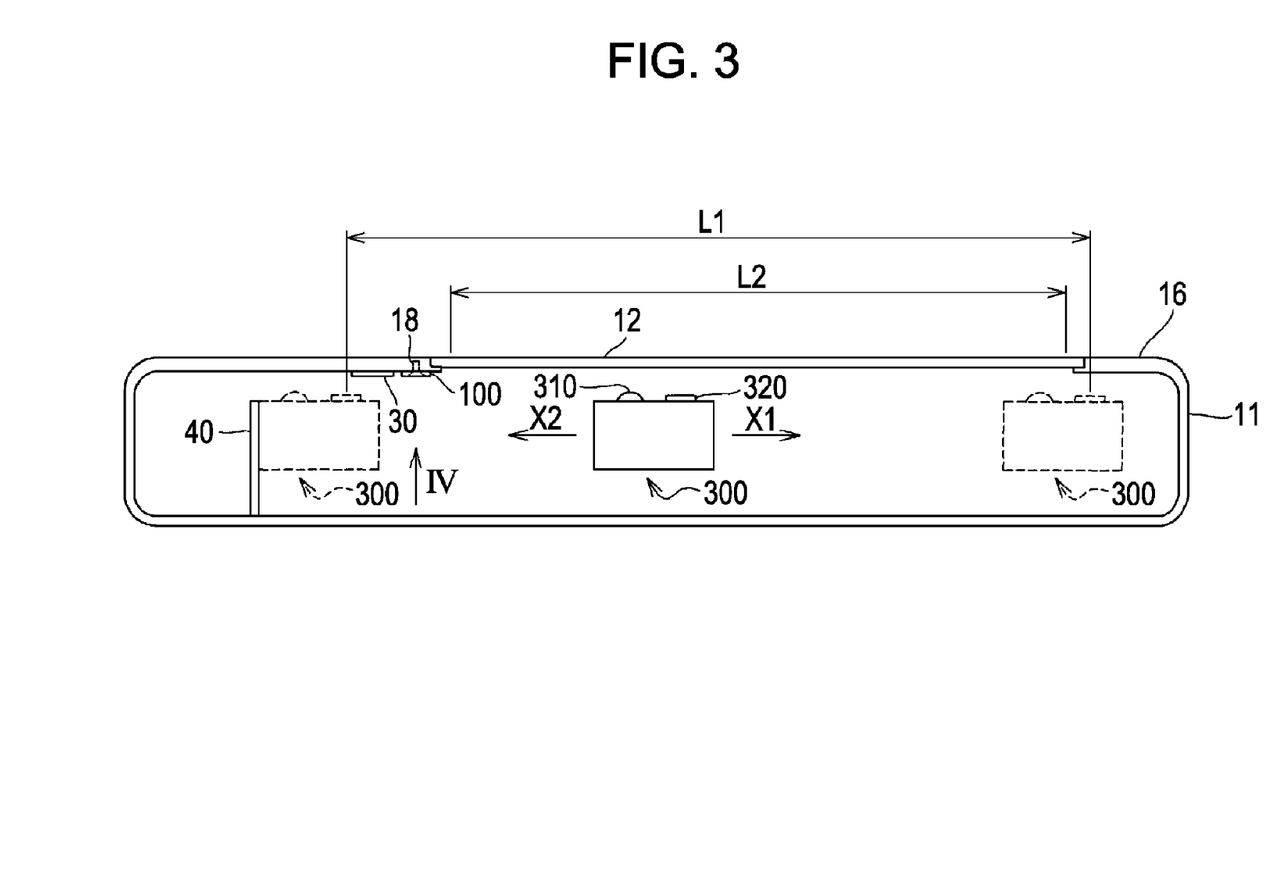
FIG. 3 is a schematic cross-sectional view showing the image reader 10.

FIG. 3 is a schematic cross-sectional view of the image reader 10. In FIG. 3, the guide rail 210, the timing belt 222, the stepping motor 226, the control unit 230, the flat cable 240 and the power source unit 250 are omitted. The reading unit 300 can move to a location (hereinafter, referred to as a forward limit location) of the reading unit 300 denoted by a dotted line at the right side of FIG. 3 in the forward sub-scan direction (the direction denoted by an arrow X1). The reading unit 300 can move to a location (hereinafter, referred to as a backward limit location) of the reading unit 300 denoted by a dotted line at the left side of FIG. 3 in the backward sub-scan direction (the direction denoted by an arrow X2). Accordingly, the reading unit 300 can move over the length L1 of the sub-scan direction shown in FIGS. 2 and 3 between the forward limit location and the backward limit location.

The reading unit 300 is in contact with the pad 40 which is fixed to the casing 11 and extends in the main scan direction at the backward limit location. In the following description, bringing of the reading unit 300, which moves backward in the sub-scan direction, into contact with the pad 40 at the limit location is called "contact".

As described above, the reading unit 300 can optical read the image in a readable area 400 having the length W1 of the main scan direction and the length L1 of the sub-scan direction by repeating a detection operation for detecting the reflected light of the light irradiated from the light-emitting unit 310 by the light-receiving elements 322, 323, and 328 of the light-receiving unit 320 and a movement operation for moving the reading unit 300 between the forward limit location and the backward limit location in the sub-scan direction. The length L1 of the sub-scan direction of the readable area 400 is larger than the length of the sub-scan direction of the original reading area 500 which is a maximum area for reading the original placed on the original mounting plate 12 by the reading unit 300. The length of the sub-scan direction of the original reading area 500 is denoted by L2 as shown in FIGS. 2 and 3 and the length of the main scan direction is equal to the length W1 of the main scan direction of the readable area 400. It is preferable that the length W1 of the main scan direction of the readable area 400 and the original readable area 500 is approximately equal to the length of the main scan direction of the original mounting plate 12 in a range which does not exceed the length of the main scan direction of the original mounting plate.

Figure 4:
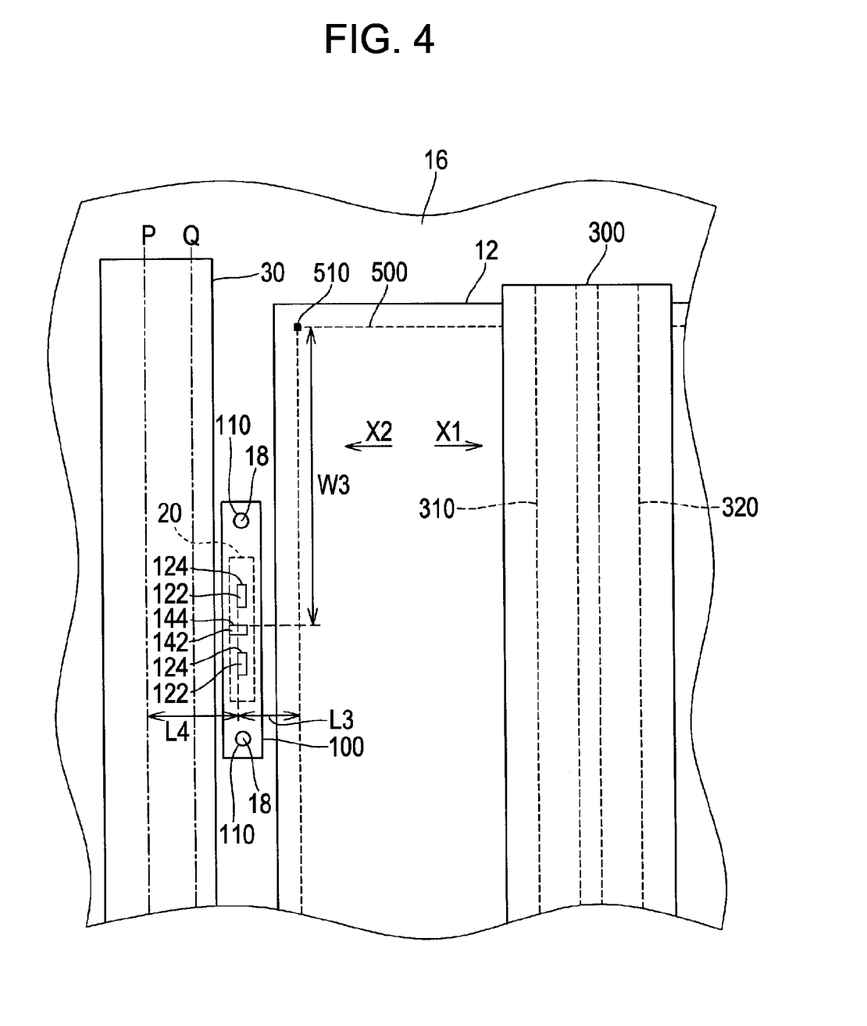
FIG. 4 is a schematic plan view showing the image reader 10 when viewed in a direction denoted by an arrow IV shown in FIG. 3.
Figure 5:
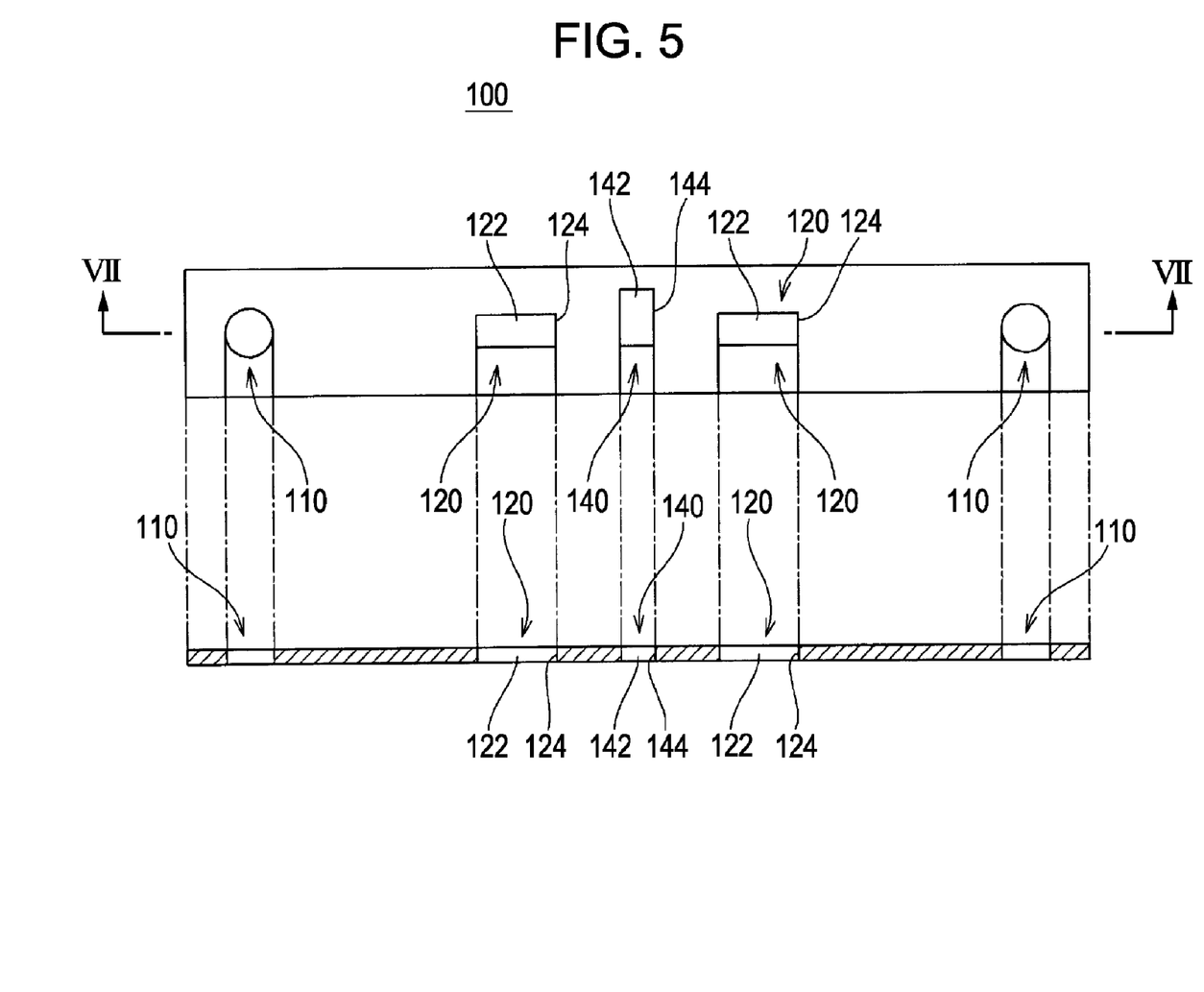
FIG. 5 is a plan view of a reference location specifying plate 100 and a cross-sectional view taken along line VII-VII of the plan view when viewed from the bottom of FIG. 5.

FIG. 4 is a schematic plan view showing the image reader 10 when viewed in a direction denoted by an arrow IV shown in FIG. 3. FIG. 5 is a plan view of a reference location specifying plate 100 and a cross-sectional view taken along line VII-VII of the plan view when viewed from the bottom of FIG. 5. As shown in FIGS. 3 and 4, the image reader 10 includes the reference location specifying plate 100 in the inner surface of the support 16.

As shown in FIG. 5, the reference location specifying plate 100 is an approximately rectangular plate and includes a pair of positioning holes 110 provided at the both sides of the plane of the reference location specifying plate 100, a pair of reference mark holes 120 provided linearly symmetrical with respect to the center of the plane of the reference location specifying plate 100, and a second reference mark hole 140 provided at the center of the plane of the reference location specifying plate 100. The positional holes 110, the reference mark holes 120 and the second reference mark hole 140 are formed in the reference location specifying plate 100 by a press working method or a machining method using, for example, a mold, such that the positional relationship among them becomes accurate. Accordingly, in the reference location specifying plate 100, the locations of the reference mark holes 120 and the second reference mark hole 140 are accurately decided with respect to the location of the positioning holes 110. In addition, it is preferable that the plane portion excluding portions, in which the positioning holes 110, the reference mark holes 120 and the second reference mark hole 140 of the reference location specifying plate 100 are provided, is colored white having high reflectivity. Accordingly, for example, polypropylene or polystyrene is preferably used in the reference location specifying plate 100.

The positional holes 110 of the reference location specifying plate 100 is circular holes provided by perforating into the reference location specifying plate 100 in a direction perpendicular to the plane thereof. The reference location specifying plate 100 is positioned and fixed on the inner surface of the support 16 in the readable area 400 by inserting flat countersunk head screws 18 into screw holes (not shown) provided at the attachment location of the reference location specifying plate 100 on the inner surface of the support 16 and the positioning holes 110. A method of positioning and fixing the reference location specifying plate 100 on the inner surface of the support 16 is not limited to the fixing method using the flat countersunk head screws 18. The reference location specifying plate 100 may be, for example, attached and fixed to the inner surface by inserting positioning protrusions provided on the inner surface of the support 16 into the positioning holes 110.

The pair of reference mark holes 120 of the reference location specifying plate 100 is the same rectangular through-hole. Each of the pair of reference mark holes 120 has a first edge 122 which is parallel to the main scan direction and a second edge 124 which is parallel to the sub-scan direction, when the reference location specifying plate 100 is fixed on the inner surface of the support 16.

The second reference mark hole 140 of the reference location specifying plate 100 is a rectangular through-hole different from the reference mark holes 120. The second reference mark hole 140 has a first edge 142 which is parallel to the main scan direction and a second edge 144 which is parallel to the sub-scan direction, when the reference location specifying plate 100 is fixed on the inner surface of the support 16. As shown in FIGS. 4 and 5, the second edge 144 of the second reference mark hole 140 crosses a straight line which extends from the first edges 122 of the reference mark holes 120 in the main scan direction.

A colored area 20 is provided at the attachment location of the reference location specifying plate 100 of the inner surface of the support 16. The colored area 20 is a darkly-colored pattern formed in an area including locations corresponding to the reference mark holes 120 and the second reference mark hole 140 of the reference location specifying plate 100 by a printing method when the reference location specifying plate 100 is fixed on the inner surface of the support 16 at the attachment location. Here, the dark color is color having low reflectivity such as black. The location of the colored area 20 and the size of the colored area 20 in the inner surface of the support 16 include the locations corresponding to the reference mark holes 120 and the second reference mark hole 140 and are not exposed to the outside of the reference location specifying plate 100 when the reference location specifying plate 100 is fixed at the attachment location.

By providing the colored area 20, the inside of the reference mark holes 120 and the second reference mark hole 140 of the reference location specifying plate 100 becomes the dark color having low reflectivity when the reference location specifying plate 100 is attached at the attachment location as shown in FIG. 4. Accordingly, the color contrast is increased at the inside (black) and the outside (substantially white) of the reference mark holes 120 and the second reference mark hole 140 of the reference location specifying plate 100. Instead of the colored area 20, a darkly-colored sheet having the substantially same size as the colored area 20 may be used. If the darkly-colored sheet is used, the darkly-colored sheet is interposed between the support 16 and the reference location specifying plate 100 at the attachment location of the reference location specifying plate 100 of the inner surface of the support 16. At this time, the darkly-colored surface of the darkly-colored sheet is exposed through the reference mark holes 120 and the second reference mark hole 140. If the darkly-colored sheet is used, the colored area 20 does not need to be formed on the inner surface of the support 16 by the printing method and thus the manufacturing process can be simplified.

As shown in FIGS. 3 and 4, the image reader 10 further includes a white reference plate 30 which is provided adjacent to the reference location specifying plate 100. The white reference plate 30 is an approximately rectangular plate and is fixed on the inner surface of the support 16 in the readable area 400 by an adhesion method. The length of the main scan direction of the white reference plate 30 is large of the length of the main scan direction of the reading unit 300 and the surface of the white reference plate 30, which is exposed when the white reference plate 30 is fixed to the inner surface of the support 16, has the color having high reflectivity, such as white. Accordingly, for example, polypropylene or polystyrene is preferably used in the white reference plate 30.

Figure 6:
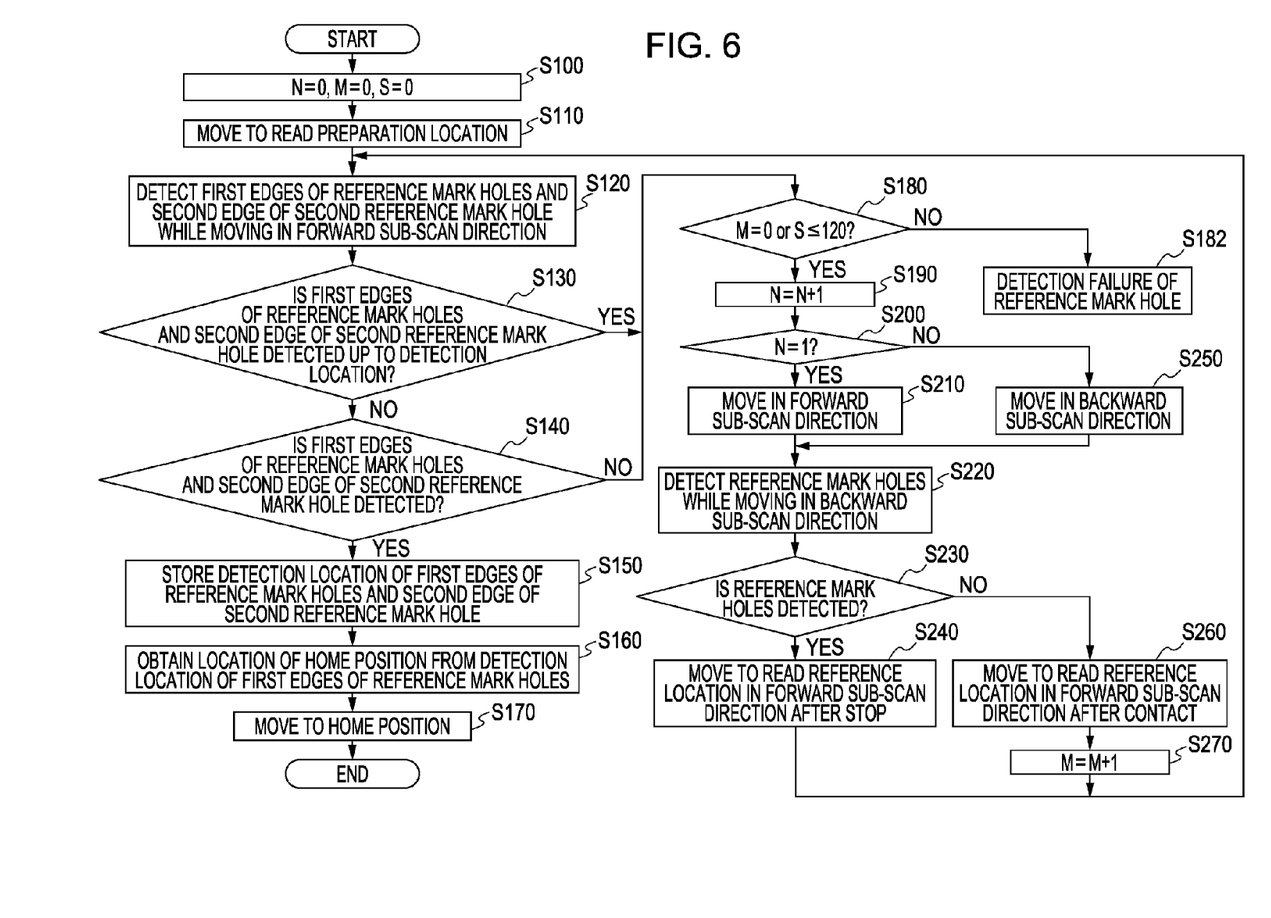
FIG. 6 is a flowchart showing a home position detecting operation of the image reader 10.

FIG. 6 is a flowchart showing a home position detecting operation of the image reader 10. The image reader 10 performs the following home position detecting operation after various initializing operations at the time of applying power.

In the home position detecting operation of the image reader 10, first, the number of times N of reference mark hole detection retry, the number of times M of contact and the home position detecting operation time S stored in the control unit 230 are reset to 0 and the count of the home position detecting operation time S is started (step S100). Next, the control unit 230 detects the number of steps of the stepping motor 226 and moves the reading unit 300 to the read preparation location on the basis of the detected number of steps and the location information of the read preparation location stored in the control unit 230 (step S110). Here, in a state in which the reading unit 300 moves to the read preparation location, the light-emitting unit 310 and the light-receiving unit 320 of the reading unit 300 are located at specific locations of the white reference plate 30, that is, locations facing the location of a dotted line Q in FIG. 4. At this time, the reading unit 300 outputs the image information of the specific locations of the white reference plate 30 to the control unit 230, and the control unit 230 performs shading correction with respect to the image information read by the reading unit 300 on the basis of the image information output from the reading unit 300. The control unit 230 stores the shading correction value and performs the same correction with respect to the image information which will be received from the reading unit 300 later, on this correction value.

Next, the control unit 230 moves the reading unit 300 in the forward sub-scan direction and detects first edges 122 of the reference mark holes 120 and a second edge 144 of the second reference mark hole 140 (hereinafter, all referred to as a "detection object") in the image information read by the reading unit 300 (step S120). Here, the method of detecting the detection object by the reading unit 300 is not specially limited. For example, the detection object may be detected by comparing the image information obtained when the reading unit 300 reads the backward sub-scan direction side of the first edges 122 of the reference mark holes 120 with the image information obtained when the reading unit reads the forward sub-scan direction side of the first edges 122 of the reference mark holes 120 in the intensity distribution of the reflected light of the image information.

Next, the control unit 230 detects whether the reading unit 300 detects the detection object up to a location (hereinafter, referred to as a "detection location") spaced apart from the read preparation location by a predetermined distance in the forward sub-scan direction, on the basis of the image information output from the reading unit 300 which is moving in the forward sub-scan direction (step S130). Then, the control unit 230 further move the reading unit 300 in the forward sub-scan direction and detects whether the detection object is detected, if the reading unit 300 does not detect the detection object up to the detection location (Step S140).

Here, the detection location is, for example, set as follows. That is, the detection location is a location which is closer to the read preparation location than a location where the detection object is assumed to be detected, by moving the reading unit 300 in the forward sub-scan direction, in the case where the reading unit 300 is accurately moved to the reading preparation location stored in the control unit 230. By setting the detection location as described above, the control unit 230 can detect the status which is not suitable for the home position detecting operation, that is, the case where the reading unit 300 is not accurately moved to the read preparation location stored in the control unit 230.

The control unit 230 stores the location information of the detection location of the detection object on the basis of the image information output from the reading unit 300 when the reading unit 300 detects the detection object at the forward sub-scan direction side of the detection location (step S150). The control unit 230 obtains the location of the home position on the basis of the location information of the detection location of the first edges 122 of the reference mark holes 120 (step S160). The control unit 230 moves the reading unit 300 to the location of the home position on the basis of the obtained location of the home position (step S170) and finishes the home position detecting operation. The location of the home position of the image reader 10 is the location denoted by a dotted line P of FIG. 4 and the distance from the detection location of the first edges 122 of the reference mark holes 120 to the location of the home position is denoted by L4 of FIG. 4.

In the step S130, in the case where the control unit 230 detects that the reading unit 300 detects the detection object from the read preparation location to the detection location or in the case where the reading unit 300 does not detect the detection object, it is assumed that the number of steps of the stepping motor 226 detected by the control unit 230 or the location information of the read preparation location stored in the control unit 230 is erroneous. Accordingly, in this case, the reading unit 300 cannot normally detect the detection object in the home position detecting operation. Hereinafter, the steps which are performed in this case will be described.

In this case, the control unit 230 determines whether the home position detecting operation time S is equal to or less than a predetermined time or whether the number M of times of contact is 0 (step S180). If it is determined that the home position detecting operation time S is equal to or less than the predetermined time or that the number M of times of contact is 0, the control unit 230 adds 1 to the number of times N of reference mark hole detection retry (step S190).

Next, the control unit 230 determines whether the number of times N of reference mark hole detection retry, to which 1 is added in the step S190, is 1 (step S200). If the number of times N of reference mark hole detection retry is 1, the control unit 230 moves the reading unit 300 by a predetermined distance in the forward sub-scan direction (step S210). It is preferable that the predetermined distance is sufficiently larger than the width of the sub-scan direction of the reference location specifying plate 100.

The control unit 230 detects the rough locations of the reference mark holes 120 and the second reference mark hole 140 by the reading unit 300 while moving the reading unit 300 in the backward sub-scan direction (step S220), after the reading unit 300 is moved by the predetermined distance in the forward sub-scan direction in the step S210. The control unit 230 determines whether the rough locations of the reference mark holes 120 and the second reference mark hole 140 are detected by the reading unit 300 in the step S220 (step S230).

When it is determined that the rough locations of the reference mark holes 120 and the second reference mark hole 140 are detected by the reading unit 300 in the step S230, the control unit 230 stops the movement of the reading unit 300 in the forward sub-scan direction and moves the reading unit 300 by a predetermined distance in the forward sub-scan direction (step S240). It is preferable that the predetermined distance, for example, corresponds to a distance from a location where the movement of the reading unit 300 in the forward sub-scan direction is stopped in the step S240 to the read preparation location. The control unit 230 repeats the steps after the step S120, after the reading unit 300 is moved by the predetermined distance in the forward sub-scan direction in the step S240.

If the rough locations of the reference mark holes 120 and the second reference mark hole 140 are not detected by the reading unit 300 in the step S230, the reading unit 300 continuously moves in the forward sub-scan direction and then contacts the pad 40 at the backward limit location. When it is detected that the reading unit 300 contacts the pad 40 through the stepping motor 226, the control unit 230 stops the movement of the reading unit 300 in the backward sub-scan direction and moves the reading unit 300 from the stopped location to the read preparation location (step S260). A distance from the backward limit location to the read preparation location is already known and is stored in the control unit 230.

At this time, the control unit 230 adds 1 to the stored number of times M of contact (step S270). The control unit 230 moves the reading unit 300 to the read preparation location in the step S260, adds 1 to the stored number of times M of contact again in the step S270, and repeats the steps after the step S120 again.

In the step S180, if the home position detecting operation time S is greater than the predetermined time and the number of times M of contact is not 0, the control unit 230 determines that the reference mark hole detection fails and finishes the home position detecting operation (step S182). In this case, the control unit 230 may output information indicating that the reference mark hole detection fails to an external device.

If it is determined that the number of times N of reference mark hole detection retry is not 1 in the step S200, the control unit 230 moves the reading unit 300 by the predetermined distance in the backward sub-scan direction (step S250). The control unit 230 performs the steps after the step S220 after moving the reading unit 300 by the predetermined distance in the backward sub-scan direction in the step S250.

Here, the control unit 230 specifies a reference location 510 of the original reading area 500, on the basis of the location information of the detection locations of the first edges 122 of the reference mark hole 120 and the second edge 144 of the second reference mark hole 140 stored in the step S150. The distance to the reference location 510 of the image reader 10 in the main scan direction is the distance between the detection location of the second edge 144 of the second reference mark hole 140 and the reference location 510 and is denoted by W3 in FIG. 4. The distance of the sub scan direction is the distance between the detection locations of the first edges 122 of the reference mark holes 120 and the reference location 510 and is denoted by L3 in FIG. 4.

The location of the original reading area 500 of the image reader 10 is specified on the basis of the specified reference location 510. The reference location 510 of the original reading area 500 is not specially limited if the original reading area 500 can be specified.

The image reader 10 according to the present embodiment includes the reference location specifying plate 100 which is positioned and fixed by the flat countersunk head screws 18 and the positioning holes 110 with respect to the support 16 and has the reference mark holes 120 and the second reference mark hole 140 formed such that the positional relationship with the positioning holes 110 becomes accurate. In the image reader 10, the reference location 510 of the original reading area 500 is specified by optically detecting the first edges 122 of the reference mark holes 120 and the second edge 144 of the second reference mark hole 140 by the reading unit 300. Accordingly, compared with the case where a reference mark for specifying the reference location 510 of the original reading area 500 is, for example, printed on the support 16, in the image reader 10 according to the present embodiment, the locations of the reference mark holes 120 and the second reference mark hole 140, both of which are the reference marks, relative to the support 16 are more accurate. Therefore, the reference location 510 of the original reading area 500 can be more accurately specified.

In the reference mark holes 120 and the second reference mark hole 140 formed in the reference location specifying plate 100, the second reference mark hole 140 has a rectangular shape different from that of the reference mark holes 120 and the second edge 144 of the second reference mark hole 140 crosses a straight line which extends from the first edges 122 of the reference mark holes 120 in the main scan direction. Accordingly, with respect to the reference location specifying plate 100 in which the reference mark holes 120 and the second reference mark hole 140 are formed, the first edges 122 of the reference mark holes 120 and the second edge 144 of the second reference mark hole 140 are optically detected by the reading unit 300. Thus, although the corner of the reference mark hole 120 is rounded when the reference mark holes 120 are formed in the reference location specifying plate 100, a portion of the rounded corner of the reference mark hole 120 is not read. Therefore, the reading unit 300 can more accurately specify the reference location 510 of the original reading area 500 on the basis of the locations of the first edges 122 of the reference mark holes 120 and the location of the second edge 144 of the second reference mark hole 140.

Figure 7:
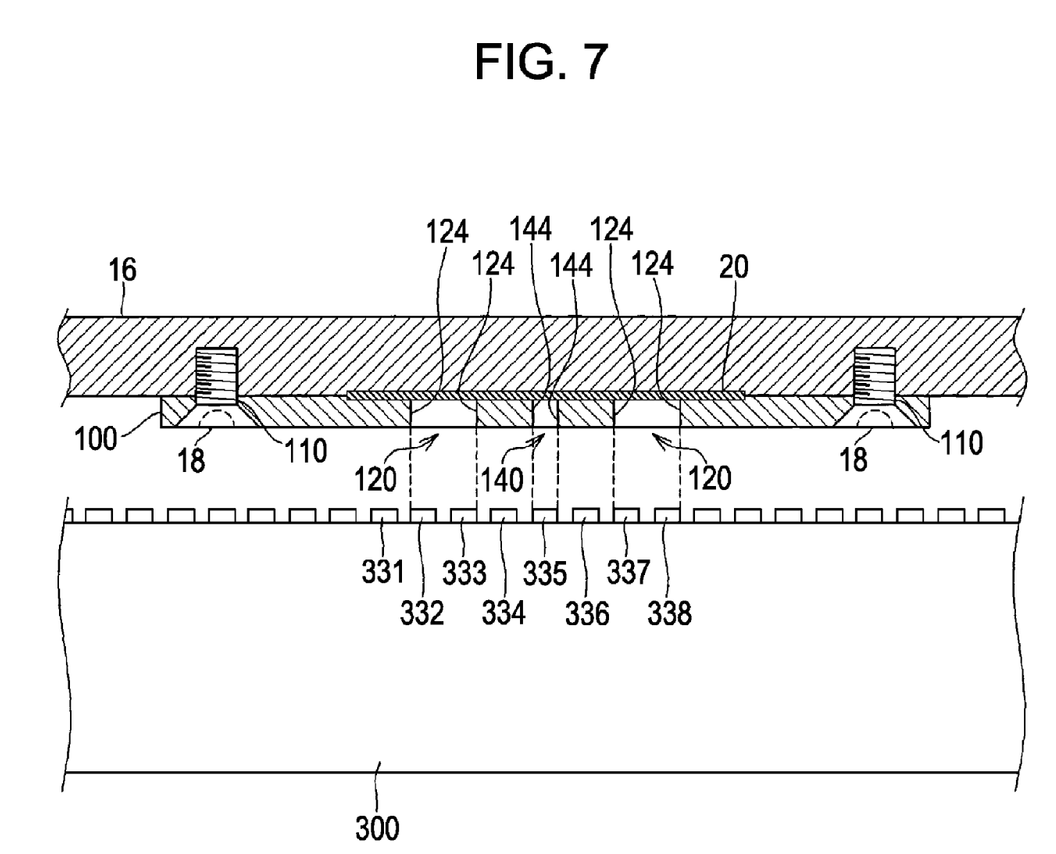
FIG. 7 is a schematic cross-sectional view showing a state in which a reading unit 300 optically detects a reference mark hole 120 and a second reference mark hole 140 of the reference location specifying plate 100.

FIG. 7 is a schematic cross-sectional view showing a state in which the reading unit 300 optically detects the second edges 124 of the reference mark holes 120 and the second edge 144 of the second reference mark hole 140 of the reference location specifying plate 100. As described above, the light-receiving unit 320 of the reading unit 300 includes the plurality of light-receiving elements 321, 322, 323, . . . and 329 arranged in the main scan direction. As shown in FIG. 2, the control unit 230 has a correction unit 260. The correction unit 260 stores information indicating which of the plurality of light-receiving elements 321, 322, 323, . . . and 329 of the reading unit 300 should read the second edges 124 of the reference mark holes 120 and the second edge 144 of the second reference mark hole 140, when the reading unit 300 and the reference location specifying plate 100 are accurately attached to the image reader 10 in design.

In more detail, the correction unit stores information indicating that, among the plurality of light-receiving elements 321, 322, 323, . . . and 329, the light-receiving elements which should detect the second edges 124 of the reference mark holes 120 are the light-receiving elements 331, 332, 336 and 337 shown in FIG. 7. The correction unit 260 stores information indicating that the light-receiving element which should detect the second edge 144 of the second reference mark hole 140 is the light-receiving element 334 shown in FIG. 7.

Here, as shown in FIG. 7, if the second edges 124 of the reference mark holes 120 of the reference location specifying plate 100 are detected by the light-receiving elements 332, 333, 337 and 338 and the second edge 144 of the second reference mark hole 140 is detected by the light-receiving element 335, the correction unit 260 detects that the original reading area 500 is shifted by one light-receiving element in the main scan direction by comparing the detected result with the above information. The correction unit 260 outputs the detected result to the control unit 230. The control unit 230 performs correction such that the plurality of light-receiving elements 322, 323, . . . and 328 corresponding to the stored location of the original reading area 500 is shifted by one light-receiving unit in the main scan direction, on the basis of the detected result output from the correction unit 260. By this correction, the reading unit 300 optically detects the original in the original reading area 500 by the light-receiving elements 321, 323, . . . and 327 among the plurality of light-receiving elements 321, 322, 323, . . . and 329 shown in FIG. 2. In the image reader 10 according to the present embodiment, even when the reading unit 300 and the reference location specifying plate 100 are not accurately attached to the image reader 10 in design and thus the location of the original reading area 500 is shifted, the shift can be corrected.

Although the embodiment of the invention is described, the technical scope of the invention is not limited to the embodiment. It will be apparent to those skilled in the art that various modifications and variations can be made in the invention. Thus, it is intended that the invention covers the modifications and variations of this invention provided they come within the scope of the appended claims and their equivalents.

What is claimed is:

1. An image reader comprising:
 a transparent original mounting plate on which an original is mounted;
 a support which has an appearance larger than that of the original mounting plate and supports the original mounting plate;
 a reading unit which optically reads the original placed on the original mounting plate;
 a movement unit which moves the reading unit in a predetermined direction within a readable area including the original mounting plate; and
 a reference location specifying plate having a positioning hole and a reference mark hole,
 wherein:
 the reference location specifying plate is positioned and fixed with respect to the support within the readable area by a fixing method which uses the positioning hole,
 the reading unit optically detects the location of the reference mark hole of the reference location specifying plate and specifies a reference location of an original reading area, in which the reading unit reads the original, from the detected location of the reference mark hole,
 the reference mark hole has a rectangular shape and includes a first edge parallel to a direction perpendicular to the predetermined direction and a second edge parallel to the predetermined direction,
 the reading unit optically detects the location of the first edge and the location of the second edge of the reference mark hole and specifies the reference location of the original reading area,
 the reference location specifying plate further includes a second reference mark hole which has a rectangular shape and includes a first edge parallel to a direction perpendicular to the predetermined direction and a second edge parallel to the predetermined direction,
 the second edge of the second reference mark hole crosses a straight line which extends from the first edge of the reference mark hole in the direction perpendicular to the predetermined direction, and
 the reading unit optically detects the at least one location of the first edge of the reference mark hole and the location of the second edge of the second reference mark hole and specifies the reference location of the original reading area.

2. The image reader according to claim 1, wherein:
 the reference mark hole includes a first edge which is parallel to a direction perpendicular to the predetermined direction, and the reading unit optically detects the location of the first edge of the reference mark hole and specifies the reference location of the original reading area in the predetermined direction.

3. The image reader according to claim 1, wherein:

the reading unit includes a plurality of light-receiving elements which are arranged in the direction perpendicular to the predetermined direction, and the image reader further includes a correction unit which stores information indicating which of the plurality of light-receiving elements should read the second edge of the reference mark hole and corrects the original reading area in the direction perpendicular to the predetermined direction on the basis of a difference between a light-receiving element, which should read the second edge of the reference mark hole based on the information, and a light-receiving element, which actually reads the second edge of the reference mark hole, among the plurality of light-receiving elements.

4. The image reader according to claim 3, further comprising a darkly-colored sheet which has a darkly-colored surface and is interposed between the support and the reference location specifying plate, wherein the darkly-colored surface is exposed through at least the reference mark hole.

* * * * *